United States Patent [19]

Conner

[11] 4,205,870
[45] Jun. 3, 1980

[54] CULINARY UTENSIL

[76] Inventor: James T. Conner, 5300 Columbia Pike, Arlington, Va. 20040

[21] Appl. No.: 938,646

[22] Filed: Aug. 31, 1978

[51] Int. Cl.² ............................................. A47J 43/28
[52] U.S. Cl. ..................................................... 294/7
[58] Field of Search ...................... 294/1 R, 7, 8, 26.5, 294/27 R, 29, 32, 49; D7/95, 99, 102–104; 99/422, 423, 644

[56] References Cited

U.S. PATENT DOCUMENTS

| D. 114,369 | 4/1939 | Moyer | D7/103 |
| D. 187,079 | 1/1960 | Horn et al. | D7/102 |
| 1,377,258 | 5/1921 | Lame | D7/95 X |
| 2,011,752 | 8/1935 | Christman | D7/95 X |
| 2,262,302 | 11/1941 | Sinclair | D7/95 X |
| 3,407,723 | 10/1968 | Varkala | D7/95 X |

FOREIGN PATENT DOCUMENTS 954117 4/1964 United Kingdom ........................ 294/7

Primary Examiner—Johnny D. Cherry
Attorney, Agent, or Firm—Cushman, Darby & Cushman

[57] ABSTRACT

A culinary utensil useful for turning eggs and the like wherein the improvement lies in the construction of the side walls so as to have either a generally S-shaped design or a generally U-shaped design with a bead at the flange of the side wall, and in the construction of the handle so that the turning axis of the grip portion thereof is parallel to the plane of the blade of the utensil.

8 Claims, 3 Drawing Figures

CULINARY UTENSIL

BACKGROUND OF THE INVENTION

The present invention relates to a spatula device useful as a culinary utensil. It has particular, but not exclusive, usefulness in turning eggs and the like which, after having been cooked on one side, are to be turned over so that the uncooked side may then be fried. Such turning or flipping operations with conventional implements require a great deal of skill and cannot be performed rapidly where, as in the case of eggs, the turning or flipping process has a tendency to injure or break the egg yolk which is undesirable.

One such conventional utensil is disclosed in U.S. Pat. No. 2,567,091 (Whitnah et al). This device has two disadvantages. First, although the patent discloses that the egg is flipped (col. 3, lines 17-25), the present inventor has found such use to be not completely successful. In this regard, he has found that the egg may merely slip along the curved edge of the side wall (without the egg turning over) and that the flipping operation quite often results in a breaking of the egg yolk due to the distance the egg must drop during the flipping operation.

Second, the Whitnah et al patent has the added disadvantage of an extra manipulation. That is, as the cook turns the utensil, he must retract the utensil quickly to deposit the egg on the frying surface (col. 3, lines 17-25). This retraction step (plus the drop that the egg must make onto the frying pan) must be properly coordinated and, hence, the chance of damage to the egg is increased.

The principal objects of the novel device described and claimed herein are to expedite and facilitate successful turning operations of this kind, and to reduce the skill required in the turning process.

SUMMARY OF THE INVENTION

The present invention proposes an improvement in spatula culinary utensils useful for turning eggs and the like. The improved result is achieved due to the generally S-shaped design of the spatula side walls and the construction of the handle so that the turning axis of the grip portion thereof is parallel to the plane of the blade of the spatula.

According to this improvement, the efficiency of the turning operation is enhanced due to the smooth curved edge of the side wall. This rounded shape of the edge has been found to permit the unimpeded fluid flow of the egg over the edge in the turning operation so that the egg pours over the side wall and onto cooking surface. In this regard, it has been found that two designs are particularly useful. One side wall design provides a generally S-shaped curved edge, while the second design has a generally U-shaped side wall with a bead at the flange of the wall. Thus, the unique design of this invention permits the turning over of an egg from a flat cooking surface with almost complete assurance of an unbroken yolk.

In view of the objects of this invention, the present device is not primarily intended to be used as a flipping instrument (e.g., as in flipping pancakes) since such flipping operations increase the likelihood of damage to the egg yolk. However, the invention can be so used if desired.

The entire scope of the present invention will become apparent from the following description and by reference to the accompanying drawings. It should be understood, however, that the description and specific examples, while indicating the preferred embodiment, are given by way of illustration only, since various changes and modifications within the spirit of the invention will become apparent as the description herein progresses.

DESCRIPTION OF THE PREFERRED EMBODIMENT

Figure 1:
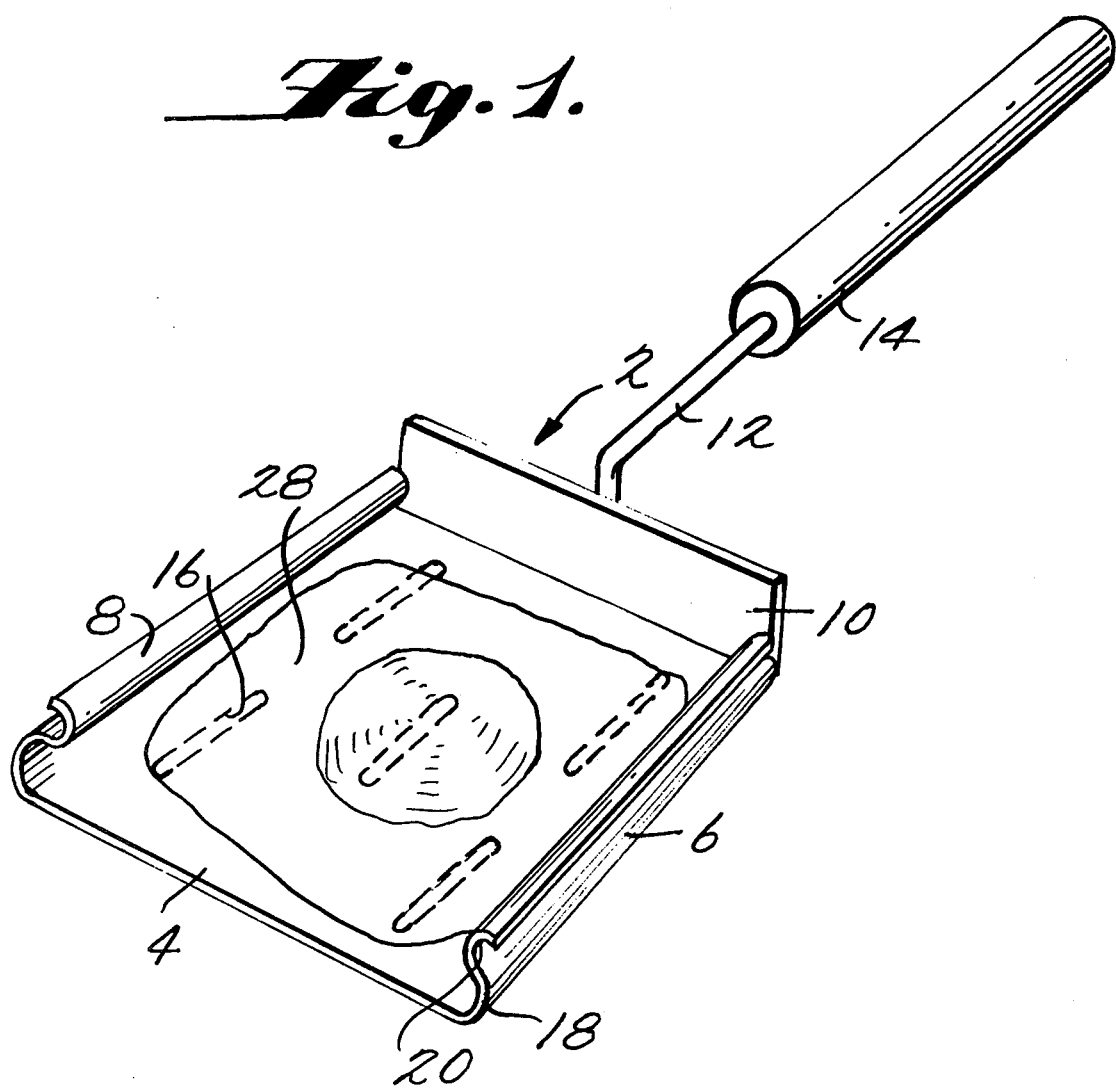
FIG. 1 shows an elevated view of a spatula according to the invention.

Referring to FIG. 1, spatula 2 is comprised of a blade or bottom extending surface 4, at least one but preferably two side walls 6 and 8, a back wall 10, a handle 12 and a gripping portion thereof 14. If so desired, the blade may have a plurality of holes 16 to permit draining of excess grease or like material. The choice of methods to make or materials to use in making the present invention is not deemed critical to the present invention and, hence, any known material and method may be used in making the invention.

The basic improvement of the present invention resides in the generally S-shaped design of the side walls 6 and 8. As noted hereinabove, the spatula may have one or two side walls. Such side walls may be flanged portions of the blade or may lie otherwise integrally connected thereto. Each side wall consists of two curved segments 18 and 20. The larger first curved segment 18 extends from said bottom surface and has the preferred dimensions of a height of ½ of an inch and a width of ⅜ of an inch. The open end of the smaller curved segment 20 faces in the opposite direction of the open end of curved segment 18 and has the preferred dimensions of a height and width of ⅛ of an inch. Both curved segments run along the entire, or substantially the entire, length of the side of blade 4. In this regard, a portion 22 of the front section of the side wall may be cut away to enhance picking up the egg.

Figure 2:
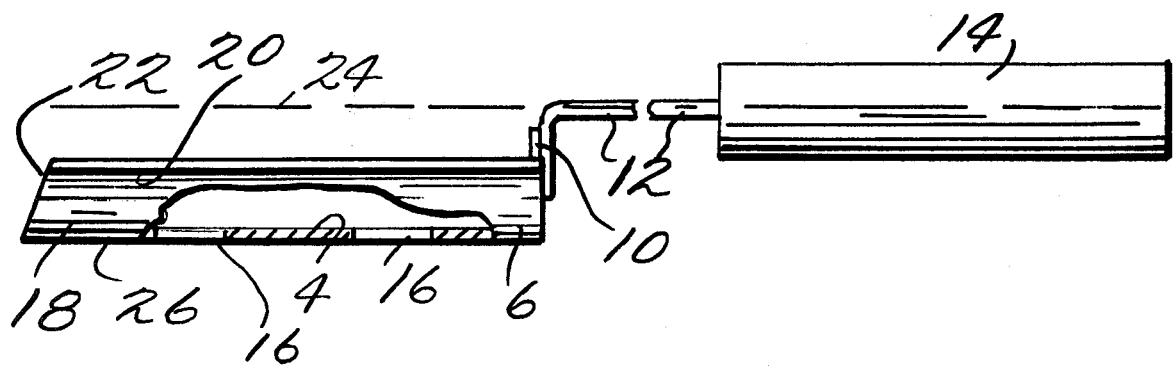
FIG. 2 shows a side view of the spatula shown in FIG. 1.

In the preferred embodiment, handle 12 is integrally connected by conventional means to back wall 10. In addition, as shown in FIG. 2, the handle is so constructed that the turning axis (shown by dotted lines 24) is generally parallel to the plane of blade 4. This design facilitates the turning of the egg since, during most of the turning operation of the egg, the length of edge 26 of the blade and side wall may remain in contact with the cooking surface.

Although the preferred embodiment discloses the concept of a handle having a parallel turning axis to the plane of the blade, this concept is not necessary in constructing the present improved spatula design. In addition, the handle of the spatula may not only extend behind the back wall as shown in FIGS. 1 and 2, but may also extend in the opposite direction (e.g., from its point of attachment on the back wall, the handle may extend over the blade), if so desired.

In operation, an egg 28 is picked up onto the top of the blade of the spatula in the conventional manner. During the turning motion, the egg slips to the larger curved segment of the side wall where the curved edge is designed to restrain or cradle the slippery egg. As the spatula is further tilted in the rolling turning motion of the operator's hand, the movement of the egg provides the necessary force for it to pour or slide over the smaller curved segment. The smaller curved portion is necessary to eliminate a potential cutting edge from the side wall to the egg and, more importantly, to facilitate the flow of the egg over the side wall. Upon completion of the turning motion, it will be found that the fluid movement of the egg over the specially designed side wall results in the egg coming to rest with its yolk unbroken and the uncooked side of the egg on the cooking surface.

Figure 3:
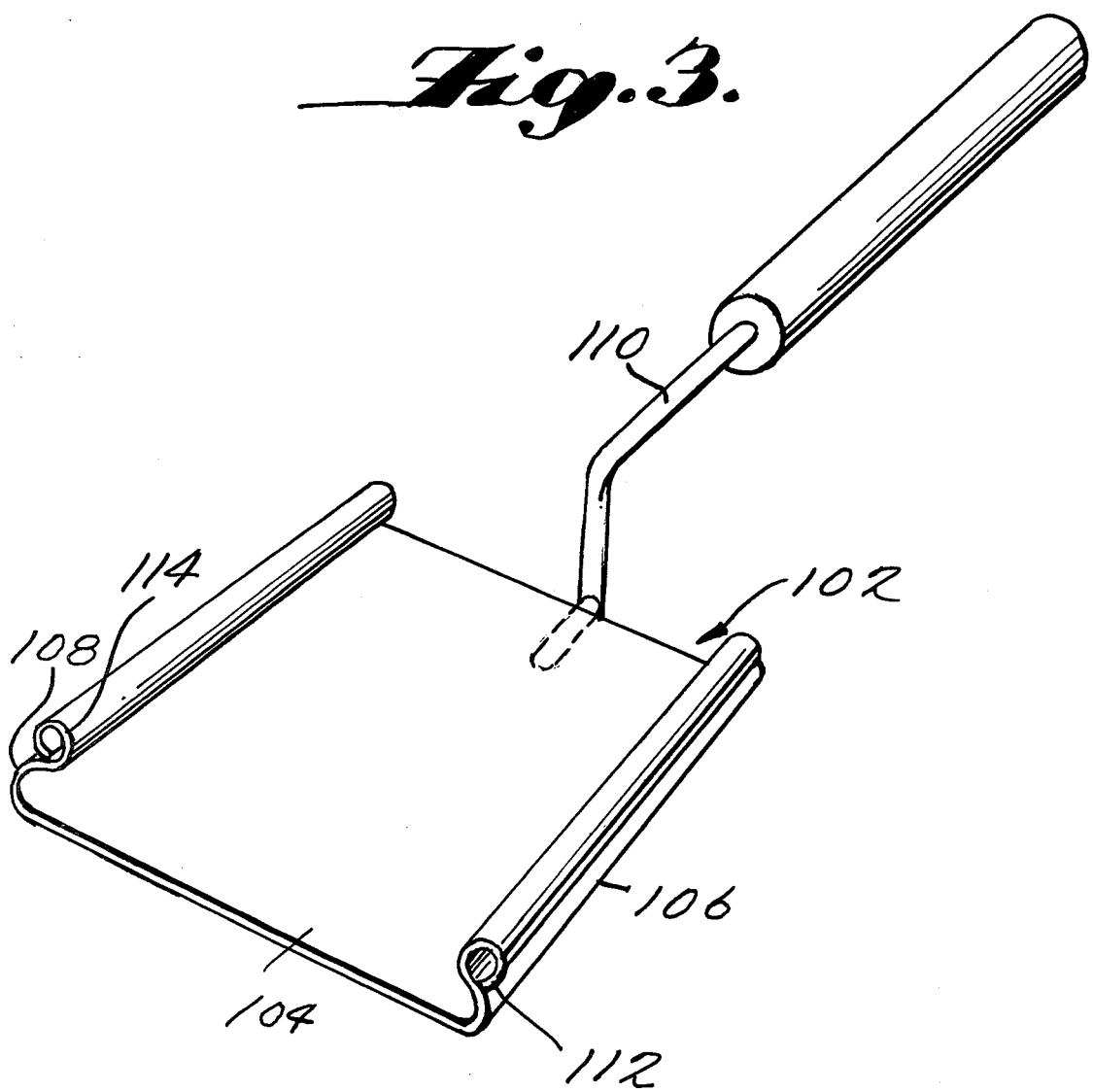
FIG. 3 shows a frontal view of a second preferred embodiment.

Referring to FIG. 3, a second preferred embodiment of a spatula 102 contains a blade or bottom extending surface 104, at least one but preferably two side walls 106 and 108, and a handle 110 affixed to said bottom extending surface 104. The basic improvement of this embodiment also resides in the shape of the side walls. Here, the design provides for a generally U-shaped side wall wherein the flange of each side wall is provided with a bead 112 and 114. Said bead 112 and 114 may be formed by rolling the metal which forms the side wall, as shown in FIG. 3, or the bead may be formed by casting the metal or non-metal side wall. Bead 112 and 114 is necessary to eliminate a potential cutting edge and to control the flow of the egg over the side wall. The generally U-shaped segment of the side wall has the preferred dimensions of a height of ½ of an inch and the width of ⅜ of an inch.

It is to be understood that, although two preferred embodiments have been described and shown hereinabove, the present invention is not limited to the specific details and dimensions shown and described, but includes all modifications coming within the scope of the appended claims and their equivalents.

What is claimed is:

1. A cooking utensil comprising a bottom extending surface, one smoothly curved side wall integrally connected to said surface, wherein said side wall is composed of two generally U-shaped segments, the first segment extending from said surface with its open end facing in a direction opposite the direction of the open end of the second segment and with said first segment having a height of about ¼ of an inch above said surface and with the width of said first segment being about ⅜ of an inch, which second segment extends from said first segment and said second segment having a height and width of about ⅛ of an inch, and a handle integrally connected to said surface and extending therefrom on a side which is neither the same as nor opposite to said side wall.

2. A cooking utensil as claimed in claim 1, wherein there are two side walls disposed on opposite sides of said surface.

3. A cooking utensil as claimed in claim 2, wherein said utensil also comprises a back wall, and wherein said handle is integrally connected to said back wall.

4. A cooking utensil as claimed in claim 3, wherein the turning axis of said handle is generally parallel to the plane of said surface.

5. A cooking utensil comprising a bottom extending surface, one smoothly curved side wall integrally connected to said surface at one end and having a flange at the other end of said side wall, wherein said side wall is comprised of a generally U-shaped segment extending from said surface with said segment having a height of about ½ of an inch above said surface and a width of about ⅜ of an inch, and of a bead at the flange of said segment, and a handle integrally connected to said surface and extending therefrom on a side which is neither the same as nor opposite to said side wall.

6. A cooking utensil as claimed in claim 5, wherein there are two side walls disposed on opposite sides of said surface.

7. A cooking utensil as claimed in claim 6, wherein said utensil also comprises a back wall and wherein said handle is integrally connected to said back wall.

8. A cooking utensil as claimed in claim 7, wherein the turning axis of said handle is generally parallel to the plane of said surface.

* * * * *